(12) United States Patent
Flett

(10) Patent No.: US 11,704,411 B2
(45) Date of Patent: Jul. 18, 2023

(54) OPERATING SYSTEM ENCRYPTION SYSTEM AND METHOD

(71) Applicant: NCR Corporation, Duluth, GA (US)

(72) Inventor: Graham Flett, Scotland (GB)

(73) Assignee: NCR Corporation, Atlanta, GA (US)

( * ) Notice: Subject to any disclaimer, the term of this patent is extended or adjusted under 35 U.S.C. 154(b) by 169 days.

(21) Appl. No.: 17/117,309

(22) Filed: Dec. 10, 2020

(65) Prior Publication Data

US 2022/0188421 A1   Jun. 16, 2022

(51) Int. Cl.
*G06F 21/57* (2013.01)
*G06F 21/33* (2013.01)
*G06F 21/60* (2013.01)

(52) U.S. Cl.
CPC ............ *G06F 21/575* (2013.01); *G06F 21/33* (2013.01); *G06F 21/572* (2013.01); *G06F 21/602* (2013.01)

(58) Field of Classification Search
CPC ...... G06F 21/33; G06F 21/572; G06F 21/575; G06F 21/602; G06F 9/4416; G06F 9/4406
See application file for complete search history.

(56) References Cited

U.S. PATENT DOCUMENTS

| | | | |
|---|---|---|---|
| 7,941,847 B2 * | 5/2011 | Rivera | G06F 21/34 726/8 |
| 10,013,561 B2 | 7/2018 | Ghafoor et al. | |
| 10,154,023 B1 * | 12/2018 | Nossik | G06F 9/4416 |
| 10,445,712 B2 | 10/2019 | Flett | |
| 10,467,418 B2 | 11/2019 | Ghafoor et al. | |
| 10,762,245 B2 | 9/2020 | Roper et al. | |
| 10,855,674 B1 * | 12/2020 | Geusz | H04L 63/20 |
| 2008/0077986 A1 * | 3/2008 | Rivera | G06F 21/34 726/20 |
| 2009/0013166 A1 * | 1/2009 | Crowder, Jr. | G06F 21/57 713/189 |
| 2010/0082960 A1 * | 4/2010 | Grobman | G06F 21/575 713/171 |
| 2012/0179904 A1 * | 7/2012 | Dunn | G06F 21/575 713/155 |

(Continued)

FOREIGN PATENT DOCUMENTS

| | | | |
|---|---|---|---|
| AU | 2019100055 A4 * | 2/2019 | |
| WO | WO-2021216030 A1 * | 10/2021 | |

*Primary Examiner* — Michael Simitoski
(74) *Attorney, Agent, or Firm* — Notaro, Michalos & Zaccaria P.C.; John S. Economou

(57) ABSTRACT

A computing system and method has a pre-boot operating system stored in an encrypted form according to a first key on a first portion of a non-volatile data storage drive and a main operating system stored in an encrypted form according to a second key on a second portion of the non-volatile data storage drive. A system built in operating system (BIOS) chip is configured to initiate a first authentication process, obtain the first key after successful completion of the first authentication process, load and decrypt the pre-boot operating system into dynamic memory, and cause the pre-boot operating system to run. The pre-boot operating system is configured to initiate a second authentication process, obtain the second key after successful completion of the second authentication process, load and decrypt the main operating system into dynamic memory, and cause the main operating system to run.

5 Claims, 3 Drawing Sheets

(56) References Cited

U.S. PATENT DOCUMENTS

| | | | |
|---|---|---|---|
| 2014/0164725 A1* | 6/2014 | Jang | G06F 21/575 |
| | | | 710/316 |
| 2014/0289537 A1* | 9/2014 | Parsons | G06F 21/575 |
| | | | 713/193 |
| 2016/0323276 A1 | 11/2016 | Flett et al. | |
| 2017/0061130 A1* | 3/2017 | Ghafoor | G06F 9/4406 |
| 2017/0124329 A1* | 5/2017 | Ghafoor | G06F 21/575 |
| 2018/0204007 A1* | 7/2018 | Rangayyan | G06F 9/4406 |
| 2018/0278415 A1* | 9/2018 | Von Der Lippe | H04L 9/0822 |
| 2018/0322271 A1* | 11/2018 | Arora | G06F 21/31 |
| 2019/0050247 A1* | 2/2019 | El-Moussa | G06F 21/53 |
| 2022/0035925 A1* | 2/2022 | Jha | G06F 21/34 |

\* cited by examiner

OPERATING SYSTEM ENCRYPTION SYSTEM AND METHOD

FIELD

This disclosure relates generally to an operating system encryption system and method, and more particularly to an operating system encryption system and method which encrypts a pre-boot operating system portion of a non-volatile data storage device such as a hard disk drive or solid-state drive in a computing system.

BACKGROUND

Most computing systems operate according to an operating system stored on a non-volatile data storage device such as a hard disk drive or a solid-state drive (SSD). A built in operating system chip (BIOS) is firmware used to perform hardware initialization during the booting process (power-on startup), and to provide runtime services for operating systems and programs. Typically, a BIOS includes program code which loads an operating system from a specified location on a non-volatile data storage device at system boot. In some cases, the operating system may be encrypted on the non-volatile data storage device. In this type of architecture, as shown in FIG. 1, a computing system 100 includes a PC core 110 having, inter alia, a system BIOS chip 120 and a non-volatile data storage device 130. An unencrypted pre-boot operating system 140 (e.g., a small Linux operating system) is provided on a partition of non-volatile data storage device 130 and the main operating system 150 (e.g., a Microsoft Windows operating system) is provided in encrypted form on another partition of non-volatile data storage device 130. During the boot process, the system BIOS chip 120 causes the pre-boot operating system 140 to load and run from dynamic memory. The pre-boot operating system 140 performs an authentication process by providing a remote authentication server 160 with identification information (e.g., a certificate) via a network connection. The remote authentication server 160 responds by either providing a decryption key or authentication to the pre-boot operating system 140 to use a decryption key stored on the non-volatile data storage device 130 upon successful authentication. Alternatively, system BIOS chip 120 may instead prompt a user to enter a password and, if the user password is correct, the pre-boot operating system 140 then uses a decryption key stored on the non-volatile data storage device 130 (preprogrammed into system BIOS chip 120). The pre-boot operating system 140 then decrypts the main operating system 150 into dynamic (volatile) memory using the decryption key so that main operating system 150 may boot and run from dynamic memory.

A computing system having the main operating system stored on the main non-volatile data storage device in encrypted form is particularly useful in applications requiring high security, such as a system that processes or manages financial transactions. One such type of system is an automated teller machine (ATM). If a high security financial system becomes compromised, security issues could arise for both customers and the financial institution(s) associated with such system.

The pre-boot operating system 140 in FIG. 1 is required because a typical chip used for system BIOS has a limited read only memory (ROM) space (e.g., approximately 16 megabytes) and cannot accommodate the pre-boot operating system 140 (which is typically about 100 megabytes). Although the computing system 100 in FIG. 1 is able to encrypt the main operating system 150, the pre-boot operating system 140 cannot be encrypted on the non-volatile data storage device 130 and could, in some circumstances, be modified by attackers in an effort to compromise the system.

Accordingly, there is a need for a system and method for encrypting a pre-boot environment portion of a non-volatile data storage device such as a hard disk drive or solid-state drive in a computing system as well which also encrypts the main operating system.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
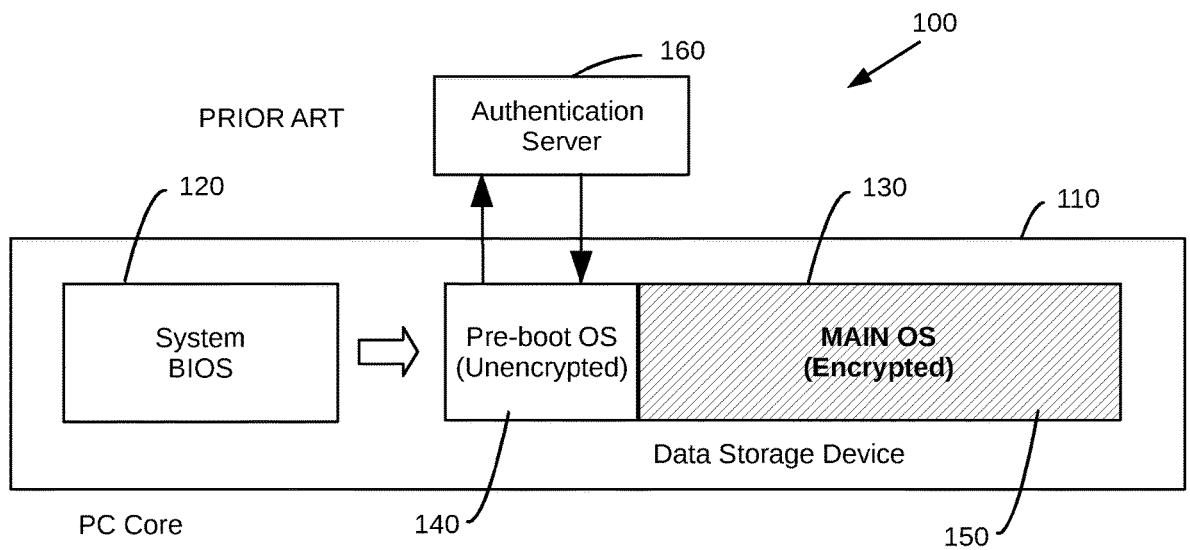
FIG. 1 is a block diagram of a prior art architecture for a computing system in which only the main operating system is encrypted on the non-volatile data storage device.
Figure 2:
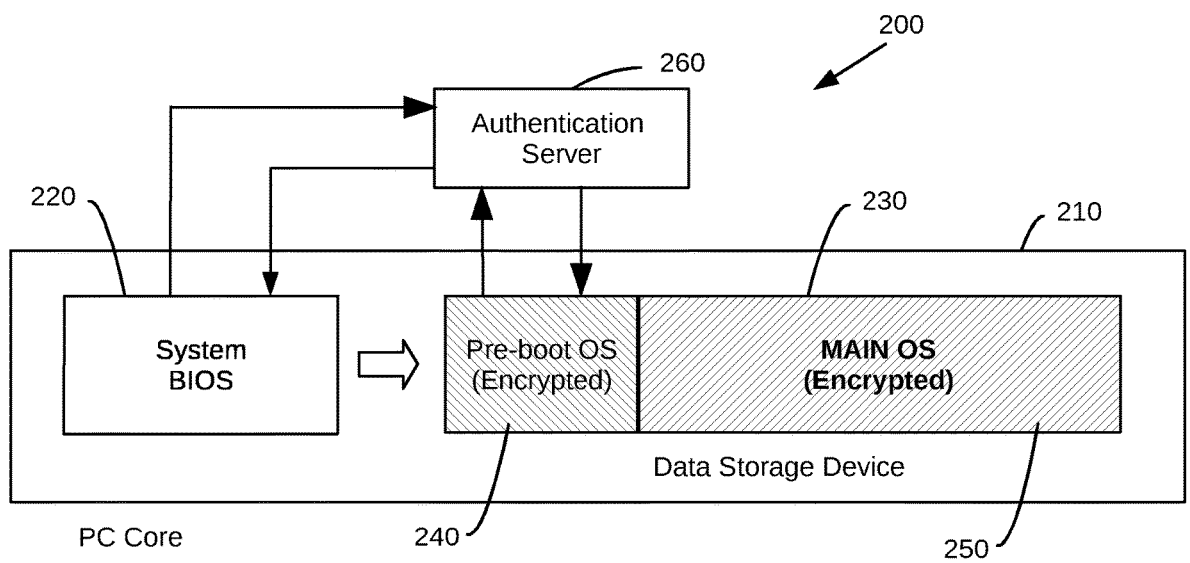
FIG. 2 is a block diagram of an architecture for a computing system according to the present disclosure which encrypts both the pre-boot operating system and the main operating system on the non-volatile data storage device.

Referring now to FIG. 2, a computing system 200 includes a PC core 210 having, inter alia, a system BIOS chip 220 and a non-volatile data storage device 230. An encrypted pre-boot operating system 240 (e.g., a small Linux operating system) is provided on one partition of the non-volatile data storage device 230 and the main operating system 250 (e.g., a Microsoft Windows operating system) is provided in encrypted form on another partition of the non-volatile data storage device 230. In computing system 200, the system BIOS chip 220 is programmed to provide an additional authentication process which allow the pre-boot operating system 240 to be stored in an encrypted format on non-volatile data storage device 230. The system BIOS chip 220 first performs an authentication in a similar manner to the pre-boot operating system 140 in the system shown in FIG. 1 and then decrypts and loads the pre-boot operating system 240 into memory, decrypting the pre-boot operating system 240 on-the-fly as it is loaded into dynamic memory prior to booting.

In particular, as shown in FIG. 2, PC core 210 is preferably coupled to a remote authentication server 260 via a secure network connection, and upon a boot request, system BIOS chip 220 is set to perform a network boot (netboot) via the remote authentication server 260 instead of booting an operating system on the non-volatile data storage device 230. This may be initiated, for example, by providing the remote authentication server 260 with identification information (e.g., a certificate). The remote authentication server 260 authenticates the boot request from system BIOS chip 220, e.g., via certificates, and then returns a decryption key to the running system BIOS chip 220 program where it is held in memory and used by the system BIOS chip 220 program to decrypt the pre-boot operating system 240 on-the-fly as it is loaded into dynamic memory.

Once the pre-boot operating system 240 is running from dynamic memory, it will then perform an authentication process by either prompting a user to enter a password or preferably by providing the remote authentication server 260 with identification information (e.g., a certificate) via the secure network connection. In the first alternative, if the user password is correct (i.e., corresponds to a stored or preconfigured password), the pre-boot operating system 240 then uses a use a second decryption key stored on the non-volatile data storage device 230 to decrypt the main operating system 250 as it is loaded into dynamic memory using the second decryption key so that the main operating system 250 may boot and run from dynamic memory. In the second alternative, the remote authentication server 260 responds by either providing a second decryption key or authentication to the pre-boot operating system 240 to use the second decryption key stored on the non-volatile data storage device 230. The pre-boot operating system 240 then decrypts the main operating system 250 into dynamic memory using the decryption key so that the main operating system 250 may boot and run from dynamic memory. Alternatively, the authentication step performed by system BIOS chip 220 may be done by providing a password prompt to the user, and then, if the password is correct, authorizing system BIOS chip 220 to use a key stored on non-volatile data storage device 230 (or preprogrammed into system BIOS chip 220).

Figure 3:
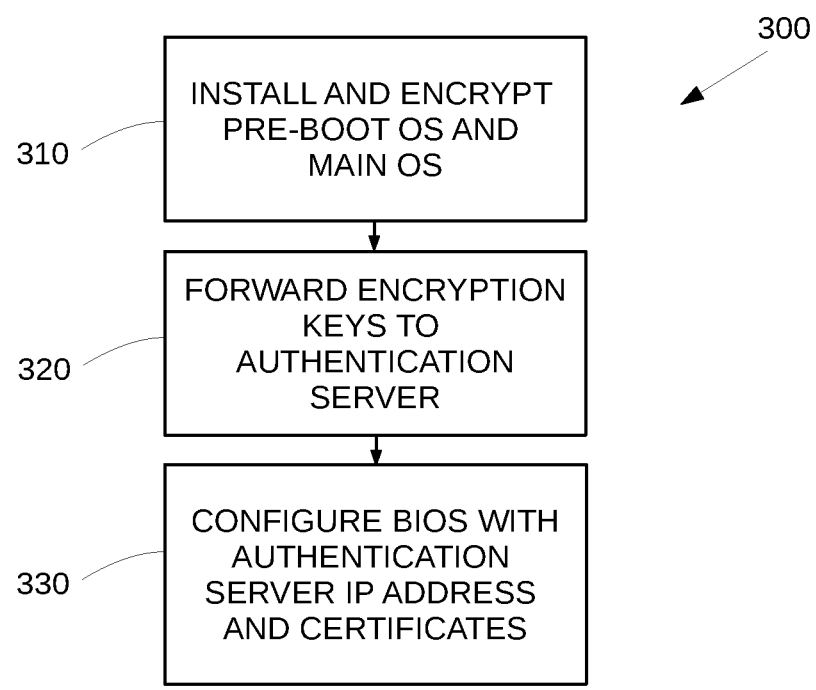
FIG. 3 is a flowchart showing the configuration sequence for a system incorporating the architecture of FIG. 2.

The configuration of computing system 200 is shown in the flowchart 300 of FIG. 3. In a first step 310, the two operating systems (i.e., the pre-boot operating system 240 and the main operating system 250) are installed and encrypted using generated keys. The generated keys are then forwarded to a secure location, e.g., the remote authentication server 260, at step 320. Finally, at step 330 the system BIOS chip 220 is configured with the internet protocol (IP) address of the remote authentication server 260 and identification information (e.g., certificates) using a BIOS configuration tool so that system BIOS chip 220 may perform an initial netboot step upon system start-up via the remote authentication server 260.

Figure 4:
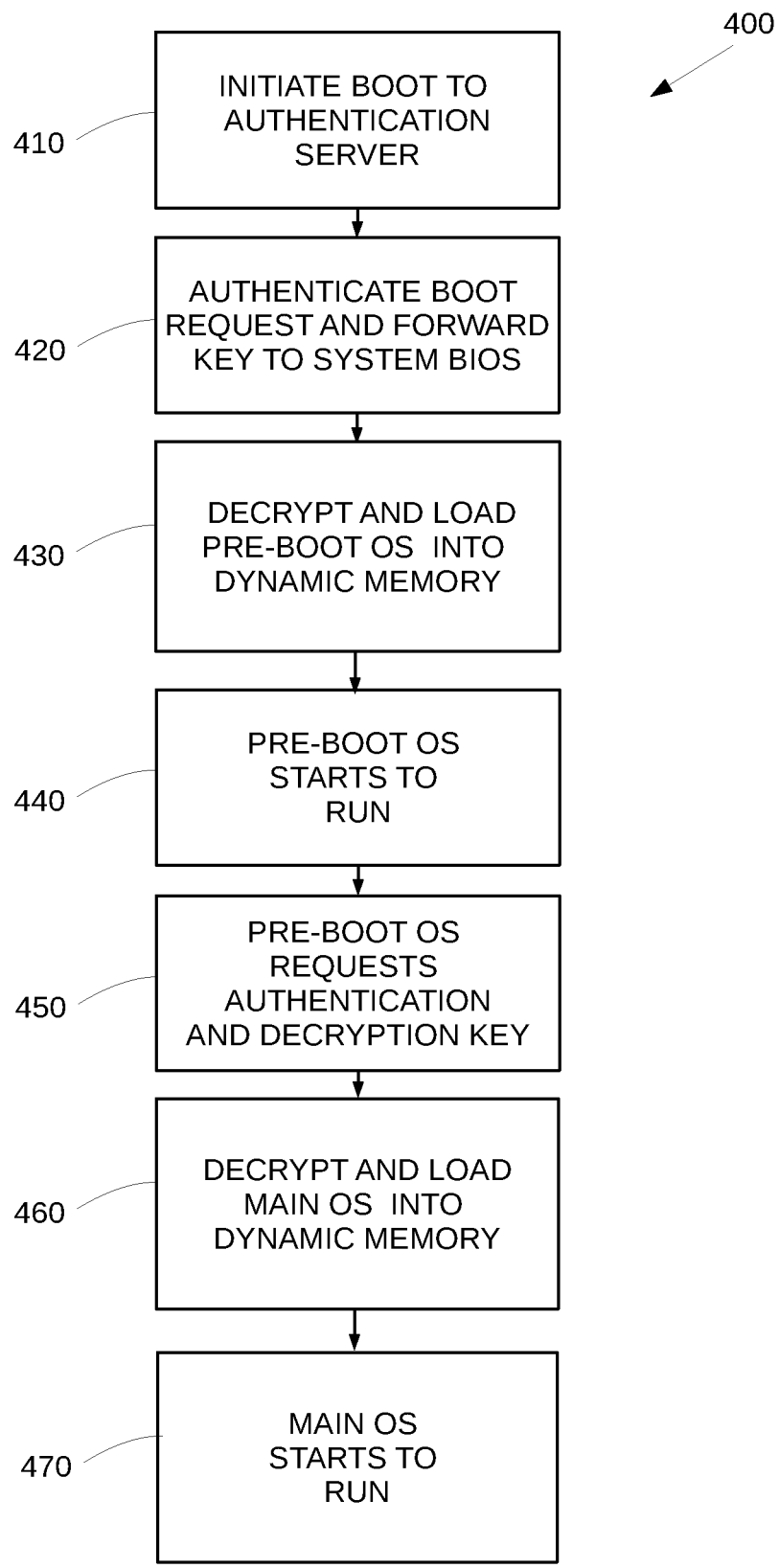
FIG. 4 is a flowchart showing the boot sequence for a system incorporating the architecture of FIG. 2.

The operation of computing system at startup is shown in the flowchart 400 of FIG. 4. In a first step 410, at power-up of PC core 210 the system BIOS chip 220 program initiates a netboot to the remote authentication server 260 via a secure network connection, per the information stored in system BIOS chip 220 at initial configuration. Identification information, such as one or more certificates stored in system BIOS chip 220 are forwarded to the remote authentication server 260 in order to validate the network connection and the identity of PC core 210. In a second step 420, the remote authentication server 260 authenticates the boot request (e.g., by confirming that the certificate or other information is valid) and returns the key to decrypt the pre-boot operating system 240 to the system BIOS chip 220 program for the pre-boot OS, where it is held in a dynamic memory. Alternatively, step 410 and step 420 may alternatively be performed by providing a password prompt to the user, and then, if the password is correct, authorizing system BIOS chip 220 to use a key stored on non-volatile data storage device 230 (or preprogrammed into system BIOS chip 220). In a third step 430, the system BIOS chip 220 program decrypts and loads the encrypted pre-boot operating system 240 into dynamic memory, using the key provided by the remote authentication server 260 (or other otherwise obtained in the alternative step when a password is used for authentication) to decrypt it on-the-fly as it is read from the non-volatile data storage device 230. By ensuring that the pre-boot operating system 240 is only decrypted to a dynamic memory and never to a permanent storage device, the system and method of the present disclosure ensures that the pre-boot operating system 240 will never be exposed to attack, e.g., by a sudden power-off during start-up. In a fourth step 440, once the pre-boot operating system 240 is decrypted and loaded into memory, the system BIOS chip 220 cause the pre-boot operating system to start to run from dynamic memory. In a fifth step 450, the pre-boot operating system 240 contacts the remote authentication server 260 (e.g., sends a certificate) in order to request authentication (e.g., via certificates) and the key to decrypt the main operating system 250. Here again, this step may be alternatively performed by providing a password prompt to the user, and, if the password is correct, authorizing the pre-boot operating system 240 running from dynamic memory to use a key stored on non-volatile data storage device 230. At a sixth step 460, the pre-boot operating system 240 decrypts and loads the encrypted main operating system 250 into dynamic memory, using the key provided by the remote authentication server 260 (or alternatively obtained from the non-volatile data storage device 230) to decrypt it on-the-fly as it is read from the non-volatile data storage device 230. Finally at step 470, the pre-boot operating system 240 causes the main operating system 250 to start.

The system and method disclosed herein ensure that both the pre-boot operating system 240 and the main operating system 250 are always encrypted when stored on the computer's non-volatile data storage device. By encrypting the pre-boot operating system 240 and moving the code for authentication and decryption inside the system BIOS chip 220, it becomes much more difficult for an attacker to access and adds an extra layer of security to protect the operating system or systems stored on the non-volatile data storage device (e.g., the hard disk or SSD).

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A computing system, comprising:
   a non-volatile data storage drive;
   a pre-boot operating system stored in an encrypted form according to a first key on a first partition of the non-volatile data storage drive;
   a main operating system stored in an encrypted form according to a second key on a second partition of the non-volatile data storage drive;
   a system built in operating system (BIOS) chip, the system BIOS chip is configured to initiate a first authentication process, obtain the first key after successful completion of the first authentication process, load and decrypt the pre-boot operating system into dynamic memory, and cause the pre-boot operating system to run from dynamic memory;
   wherein the pre-boot operating system is configured to initiate a second authentication process, obtain the second key after a successful completion of the second authentication process, load and decrypt the main operating system into dynamic memory, and cause the main operating system to run from dynamic memory;

wherein the first authentication process comprises providing first identification information to a remote authentication server, and wherein the first key is obtained from the remote authentication server; and wherein the second authentication process comprises providing second identification information to a remote authentication server, and wherein the second key is obtained from the remote authentication server.

2. The computing system of claim 1, wherein the first identification information is a certificate.

3. A method of booting a computing system, comprising:
initiating a first authentication process at a system built in operating system (BIOS) chip by providing first identification information to a remote authentication server;
obtaining a first key from the remote authentication server after successful completion of the first authentication process;
loading and decrypting a pre-boot operating system encrypted on a first partition of a non-volatile data storage device into dynamic memory;
causing the pre-boot operating system to run from dynamic memory;
initiating a second authentication process by the pre-boot operating system by providing second identification information to the remote authentication server;
obtaining a second key from the remote authentication server after a successful completion of the second authentication process;
loading and decrypting a main operating system encrypted on a second partition of the non-volatile data storage device into dynamic memory; and
causing the main operating system to run from dynamic memory.

4. The method of claim 3, wherein the first identification information is a certificate.

5. A method of configuring a computing system, comprising:
installing and encrypting a pre-boot operating system according to a first key on a first partition of a non-volatile data storage device;
installing and encrypting a main operating system according to a second key on a second partition of the non-volatile data storage device;
storing the first and second keys at a remote authentication server; and
configuring a system built-in operating system (BIOS) chip with first identification information and to perform a first authentication process upon system start-up;
configuring a pre-boot operating system chip with second identification information and to perform a second authentication process upon system start-up;
wherein the first identification information comprises a certificate, and wherein the first authentication process comprises:
forwarding the certificate to the remote authentication server; and
obtaining the first key in response to successful authentication of the certificate; and
wherein the second authentication process comprises:
forwarding the second identification information to the remote authentication server; and
obtaining the second key in response to successful authentication of the second identification information.

* * * * *